(12) United States Patent
Seemann et al.

(10) Patent No.: US 6,775,617 B2
(45) Date of Patent: Aug. 10, 2004

(54) METHOD FOR DETERMINING HYDROGRAPHIC PARAMETERS WHICH DESCRIBE A SEA SWELL FIELD IN SITU USING A RADAR DEVICE

(75) Inventors: Jörg Seemann, Schenefeld (DE); Christian M. Senet, Hamburg (DE); Friedwart Ziemer, Geesthacht (DE)

(73) Assignee: GKSS-Forschungszentrum Geesthacht GmbH, Geesthacht (DE)

( * ) Notice: Subject to any disclaimer, the term of this patent is extended or adjusted under 35 U.S.C. 154(b) by 0 days.

(21) Appl. No.: 10/348,607

(22) Filed: Jan. 21, 2003

(65) Prior Publication Data

US 2003/0167125 A1 Sep. 4, 2003

Related U.S. Application Data

(63) Continuation-in-part of application No. PCT/DE00/02414, filed on Jul. 21, 2000.

(51) Int. Cl.$^7$ ............................ G01S 13/89; G01S 7/41; G06F 169/00
(52) U.S. Cl. ................................................ 702/3; 702/5
(58) Field of Search ........................ 702/5, 2, 3, 143; 342/54, 123, 191, 192, 107, 26

(56) References Cited

PUBLICATIONS

Seemann et al., "Radar Image Sequence Analysis of Inhomogenous Water Surfaces", Applications of Digital Image Processing XXII, Denver, Co, USA, Jul. 20–23, 1999, vol. 3808, pp. 536–546, XP000992163 Proceedings of the SPIE—The Internation Society for Optical Engineering, 1999, SPIE–Int. Soc. Opt. Eng., USA, ISSN: 0277–786X.*
Seemann et al., "Hydrographic Parameter Maps Retrieved From Nautical Radar Image Sequences Of Inhomogeneous Water Surfaces", Geoscience and Remote Sensing Symposium, 2000. Proceedings. IGARSS 2000. IEEE 2000 International, vol. 5, Jul. 24–28, 2000, pp. 898–1900.*
Senet et al., "Dispersive Surface Classification: Local Analysis Of Optical Image Sequences Of The Water Surface To Determine Hydrographic Parameter Maps", OCEANS 2000 MTS/IEEE Conference and Exhibition, vol. 3, Sep. 11–14, 2000, pp. 1769–1774.*

* cited by examiner

*Primary Examiner*—Donald McElheny
(74) *Attorney, Agent, or Firm*—Klaus J. Bach (57) ABSTRACT

In a method of determining hydrographic parameters describing a sea swell field from analog signal sequences supplied by radar devices, wherein a sequence of digitized signal in spatial coordinates is generated from the analog signal sequences and, by Fourier transformation, a three-dimensional complex value frequency wave number spectrum is determined therefrom, which is filtered on the basis of the dispersion relation principle that inter-links the wave numbers and the frequencies of the sea swell for a localization of the sea swell-specific parameters by separating the signals from the noise and determining the signal to noise ratio and from the ratio the height of the waves and, by localizing the signal coordinates in the surface area defined by the dispersion relationship, parameters describing the surface currents of the sea swell field in a three-dimensional spectral space and the water depth, from the phase information concerning the waves monitored in the sea swell field the parameters of the sea swell field are determined.

5 Claims, 11 Drawing Sheets

Niveau Lines of Phase π

Fig. 7a2

Niveau Lines of Phase π

Niveau Lines of Variance (Logarithmic)

Fig. 7b1

Niveau Lines of Variance (Logarithmic)

Nivean Lines of the Phase π

METHOD FOR DETERMINING HYDROGRAPHIC PARAMETERS WHICH DESCRIBE A SEA SWELL FIELD IN SITU USING A RADAR DEVICE

This is a continuation-in-part application of International application PCT/DE00/02414 filed Jul. 21, 2000.

BACKGROUND OF THE INVENTION

The invention relates to a method for determining hydrographic parameters describing a sea swell field in situ, particularly the sea swell, the current and the water depth, by means of a radar device which provides analog signal sequences from which a sequence of digitized signals in the form of spatial coordinates is provided. From the sequence of digitized signals in spatial coordinates, a three dimensional complex value wave number frequency spectrum is determined by means of a Fourier transformation, the wave number frequency spectrum is then filtered in accordance with the principle of dispersion relationship and the wave number and frequencies of the sea swell are inter-linked for a localization of the sea swell-specific parameters by separating the signals from the noise contained in the signal sequence supplied by the radar device. Then the height of the waves is determined from the signal to noise ratio obtained and the parameters describing the current of the sea swell close to the surface and the depth of the water are determined for the three-dimensional spectral range by localization of the signal coordinates in the surface area defined by the dispersion relationship.

A radar device linked to equipment, which provides from the analog signal sequences delivered by the radar device in polar coordinates a sequence of digitized signals corresponding to the sea swell, is known from DE -OS 43 02 122.

The determination of hydrographic parameters describing in situ a sea swell field over a certain area is a theme with which the oceanographic sciences have been concerned for decades. Information concerning the behavior of an in situ sea swell field on the open sea, in coastal waters, in tide-dependent river beds and river mouth areas as well as for coastal protection measures and port construction would place the technical world including navigation, exploration and production techniques of sea-based plants in a position to develop measures for the prevention of damage from short term sea swells and the long-term behavior of sea swells. All larger nations which, as a result of their geographical location, have access to the sea or which include coastal areas exposed to sea swells, have active research programs in this field in order to receive not only short term information concerning the behavior of sea swell fields but also to obtain from the behavior information concerning long-term changes as a basis for developing measures for the protection and maintenance of the coastal land areas. It can generally be said that the sea swell and tide flows, particularly in areas close to the coast, is inhomogeneous since the water depths are different. Reference is made in this connection to current-and-depth refraction. These processes result in long term changes of the morphology. In the area of water fortifications and harbor inlets additionally a diffraction of the sea swell field occurs to which these areas are exposed and by which additional inhomogeneities of the sea swell are induced.

Mechanical and optical in situ current sensors determine a value of a current, which is representative for a small measuring volume with typical dimensions of 10 cm×10 cm (point measurement). Vertical current profiles can be established by ADCPs (Acoustic Doppler Circuit Profiler). Horizontal current profiles, that is, current maps can be calculated so far from measurements obtained by HF radar devices. However, the application field of these remote exploration sensors is limited to salt water. Areas of up to 20 km×20 km can be measured in this manner, however, with a spatial resolution of the current map of only 500 m×500 m.

From the image sequences of nautical radar using local analysis procedures current maps can be provided with a spatial resolution which is improved by an order of magnitude and the procedure can also be used in sweet waters. Because of the high spatial resolution also small-scale inhomogeneities of the current field such as whirls can be measured. The area that can be maintained is generally 2 km×2 km.

Depth maps can be established in coastal waters by echo sounding. This procedure however is time-consuming and expensive (vessel times). Echo sounding can therefore be performed only sporadically. From the image sequences of nautical radar, however, depth maps can be prepared continuously at relatively low financial and logistic expenses by a local analysis procedure. On an experimental basis, algorithms have already been developed which permit the preparation of a map of the water depth based on certain hydrographic conditions with the knowledge of the surface currents by the analysis of the radar image sequences of inhomogeneous water surfaces. A method developed by Bell [1998] requires however that the wave field consists locally of a single wave wherein the wavelength and direction of movement is spatially variable as a result of the variable water depth. Hessner et al. [1999] was the first to divide the wave field on the basis of wave frequency before determining from the individual frequency components pixel by pixel the water depth on the basis of the dispersion relationship. This method can be used if the directional dispersion of the sea swell state to be analyzed is low, since, otherwise, partial waves arriving from different directions result in interferences.

Another procedure which is utilized for the determination of parameters which describe an in situ sea swell field resides in the measurement of a one-dimensional frequency spectrum and possibly also of the moments of directional distribution of the sea swell at individual locations by means of the so-called sea buoys. Sea buoys however are not suitable for use in low depth waters, particularly in the surf or breaker range and they permit essentially only a point determination of the sea swell field. A very important disadvantage of the known method for determining the hydrographic parameters of a sea swell field by way of sea buoys is the insufficient directional characterization of the sea swell field.

Another method is the so-called global radar image sequence analysis. With the global analysis procedure values of hydrographic parameters are determined, which represent the whole analysis area. The method is used for homogenous sea swell fields, that is, sea swell fields in which the hydrographic parameters are spatially constant over the whole area of analysis.

The signal sequences (radar image sequences), interpolated onto a Cartesian grid, are converted by a three-dimensional fast Fourier transformation (3D FFT) to a three-dimensional complex-value frequency-wave number spectrum. By the global sequence analysis, the variance spectrum calculated by the formation of the square of the absolute value is evaluated.

Subsequently, the water depth d and the components of the horizontal current vector $u_x$ and $u_y$ are determined by an adaptation of the sea swell signal coordinates of the image spectrum as selected with a threshold value of the variance to the theoretical dispersion relation of the sea swell waves [Senet, 1996, Outzen, 1998]. The method used for calculating the water depth and current is preferably the so-called "Least-Squares-procedure". The current and depth values obtained by this procedure, which are representative for the whole analysis area, are the base values for the global procedure.

The dispersion relation defines an area in the spectral space, called "dispersion envelope", whose shape depends on the value of the current and the water depth. The localization of the sea swell signal on the dispersion envelope makes it possible to utilize the dispersion envelope after the calculation of the current and the water depth as a spectral filter for the separation of the signal and the noise components of the image spectrum.

The sea swell spectrum, that is, the variance spectrum of the surface deviation, is linked linearly, by way of an image transmission function, to the signal to noise ratio of the image spectrum, that is, the gray value variance spectrum. The image transmission function can be parameterized by an exponential function with the value of the wave number as basis. The significant wave height is proportional to the square root of the signal-to-noise ratio of the image spectrum (Niete et al., 1999). The calibration parameters are determined at the beginning of a measuring phase by comparison with an in situ sensor for the wave height, that is, the sea swell buoy already mentioned. After the calibration phase the image-sequence analysis can be performed independently of further in situ sea swell measurements (Ziemer, 1995). Further base output values of the global method are a 180° oriented sea swell spectrum and a value of the significant wave height representing the whole analysis area.

Also, the global image sequence analysis according to the so-called WaMoS-process described earlier has not provided satisfactory results so far, since the three-dimensional variance spectrum, on which this process is based, does not permit a complete description of the space-time correlation of the sea swell field if the sea swell field is inhomogeneous. Rather, this procedure provides only global parameters weighted over the measuring parameters and is therefore sufficient only for the open sea where a homogeneity of the sea swell field can be assumed because of sufficiently large water depths.

In addition to the procedures mentioned above for determining a depth map an analysis of inhomogeneous sea swell fields or, respectively, inhomogeneous water surfaces has been tried on the basis of a computation method which is known to the experts as MUSIC (Multiple Signal Classification). However, this procedure has been rejected by the experts since the duration of a MUSIC-based analysis of a sea swell field does not permit an operative analysis as the procedure is too slow.

It is therefore the object the present invention to provide a method for determining hydrographic parameters which describe a sea swell field in situ using a radar device wherein first analog signal sequences are provided by the radar device which exactly describe the behavior of the sea swell fields on the open sea and also near the coast. The method should also make a continuous recording of the sea swell field possible in order to provide a decision basis for the need of measures for the protection of a coast line based on the parameters collected and also to obtain indications concerning the effectiveness of measures established earlier and with respect to the influence of diffraction by the sea swell field, which may be caused by water control installations.

Furthermore, the generation of highly accurate horizontal current maps should be facilitated and influences on the behavior of the sea swell field by navigation, exploration and transport equipment should be explored. The spatial distribution of the hydrographic parameters should also be possible by means of the method according to the invention essentially on a real time basis, that is, within a period during which the values of the parameters cannot significantly change.

SUMMARY OF THE INVENTION

In a method of determining hydrographic parameters describing a sea swell field from analog signal sequences supplied by radar devices, wherein a sequence of digitized signal in spatial coordinates is generated from the analog signal sequences and, by Fourier transformation, a three-dimensional complex value frequency wave number spectrum is determined therefrom, which is filtered on the basis of the dispersion relation principle that inter-links the wave numbers and the frequencies of the sea swell for a localization of the sea swell-specific parameters by separating the signals from the noise and determining the signal to noise ratio and from the ratio the height of the waves and, by localizing the signal coordinates in the surface area defined by the dispersion relationship, parameters describing the surface currents of the sea swell field in a three-dimensional spectral space and the water depth, from the phase information concerning the waves monitored in the sea swell field the parameters of the sea swell field are determined.

The method according to the invention utilizes the effect of the wind on the sea swell as observed on the sea surface in a sea swell field by a radar device. The small-scale roughness of the sea surface as generated by a local wind field observed in the sea swell field results in a radar stray reflection, which is modulated by the waves in the observed sea swell field. The sea swell is therefore depicted by the radar device which, in principle, may be a common nautical radar device, as soon as the wind speed exceeds a predetermined threshold value, typically 2 to 3 $ms^{-1}$ and the waves are large enough, for example >40 m so that they can be resolved by the radar device.

The advantage of the method according to the invention resides essentially in the fact that it is possible with this method to determine, essentially in real time, the spatial distribution of hydrographic parameters of an inhomogeneous sea swell field that is the space time correlation of the wave field observed, the local sea swell spectrum with complete directional resolution, the field of currents near the water surface and the water depth. From these parameters, maps can be prepared concerning the water surface currents, the water depth and the local wavelength and direction distribution of the energy at the location of the sea swell field observed, so that excellent navigation aids can also be provided for the ship traffic.

With the results of the method, a continuous surveillance of the bathymetry can be achieved which causes variations in the tide currents in the coastal waters. Also, based on a possible continuous determination of the hydrographic parameters of the observed sea swell field also measures for improving the coast line protection, for example, by sand deposits, can be initiated in order to avoid the loss of land. Also, the effects of the measures introduced on the basis of the established parameters can be continuously monitored as to their effectiveness.

Because of large water depths, sea swell fields in the open sea are generally homogenous with respect to the wave number K, the frequency ω, the wavelength λ and the period τ. Sea swell fields on the open sea are therefore generally called homogenous sea swell fields or homogenous sea swells. In order to be able to use the method according to the invention also for the analysis of so-called inhomogeneous water surfaces, particularly also the inhomogenous water surfaces as they are present in low depth coastal waters, method steps of the global analyzing procedure are adapted and special procedures for the local analysis are developed such that the phase information of the waves of the sea swell contained in the complex-value frequency wave spectrum is used for the determination of the parameters in an inhomogeneous sea swell field.

While, during the analysis of homogenous sea swell fields as they have been explained above, the hydrographic parameters are determined by an analysis of the variance spectrum, with the method according to the invention for a local analysis of radar image sequences of the sea swell, additionally the phase information is employed which contains the information concerning the local image structure. It is assumed in this connection, that the wave field consists locally of individual complex-value sine waves. This condition is ensured after the frequency and direction resolution of the depicted wave field ahead of the local analysis by the dispersion relation of the linear sea swell as it is assumed for an inhomogeneous sea swell field on a local spatial scale. With a fixed frequency and wave direction of a partial wave, maximally two values of the wave number fulfill the dispersion relationship. With an observation of the sea swell field by means of the radar device from a fixed location only the smaller of the two solutions is actually relevant. The complex-value three-dimensional frequency wave signal spectrum (image spectrum), which is present already resolved by means of the Fournier transformation into individual frequency support places, is spectrum-filtered by a directional filter and a filter defined by the dispersion relationship.

Subsequently, the selected spectral intervals are reverse transformed by a two-dimensional Fourier transformation into the local frequency range.

The invention will be described in greater detail on the basis of an example with reference to the accompanying drawings.

BRIEF DESCRIPTION OF THE DRAWINGS

FIG. 4a shows the dispersion relationship depicted without Doppler displacement caused by a surface current, FIG. 4b shows the dispersion relationship with a Doppler displacement caused by a surface current, FIG. 4c shows the dispersion relationship for a low water depth relative to the wavelength of the sea swell.

FIGS. 7a1 and 7a2 show phase images and FIGS. 7b1 and 7b2 show variance images of the dispersion frequency (FIGS. 7a1, b1) and the dispersion frequency-direction divided sea swell signal, wherein the selected frequency and the wave travel direction ω=0.55 rad/s corresponds to a period of τ=11.4 s and φ=258°.

DETAILED DESCRIPTION OF THE INVENTION

The global method, which is already operational and in use, and the local method according to the invention for determining hydrographic, parameters or parameter fields describing, in situ, sea swell fields such as the sea swells, the currents and the depth of the water utilize a radar device connected to electronic equipment which forms from the analog signal sequences supplied by the radar device a sequence of digital signals which is present for example in polar coordinates. These digitized signals are the base values for the global and the local analysis of the sea swell field examined in situ.

The method utilizes the effect that, on the water surface observed, which is subjected to a sea swell, a small scale roughness is generated by the local wind field, which results in a radar back scattering that is modulated by the sea swells at the location of observation. The sea swell is therefore detected by a nautical radar device as soon as a certain threshold value of the wind speed, typically 2 to ms$^{-1}$ is exceeded and the wavelengths of the sea swell field is sufficiently large, for example >40 m, in order to permit resolution by the radar device. The signal sequences detected by the radar device, which are stored and supplied for example in polar coordinates, make the analysis of the spatial and time-dependent development of the sea swell possible. The analysis steps of the local method (the analysis steps of the global method are described in the description of the state of the art in the introduction) will be described below in detail.

Figure 1:
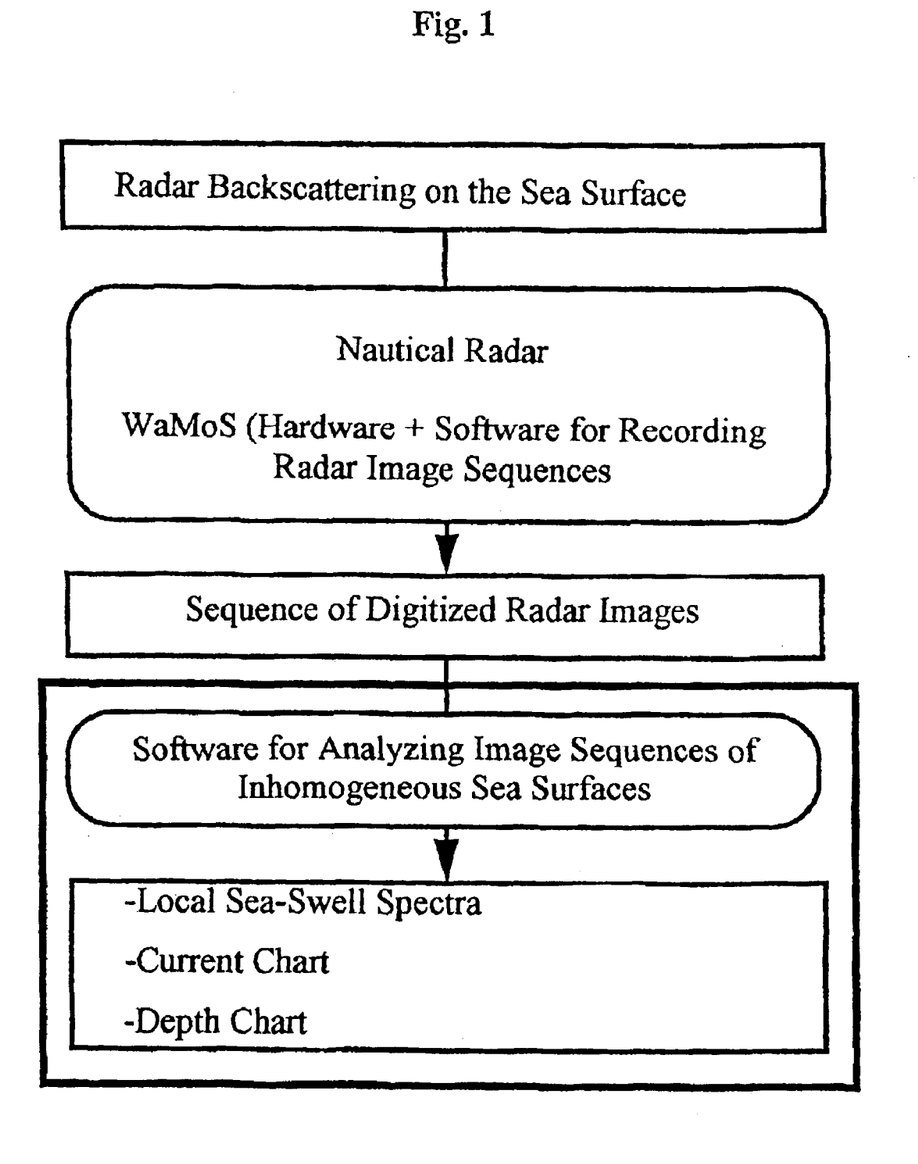
FIG. 1 presents an overview of the analog signal sequences which are provided by a radar device in the form of a sequence of digital signals and which are then subjected to a treatment according to the invention for the determination of the spatial distribution of hydrographic parameters of the observed inhomogeneous sea swell field.
Figure 2:
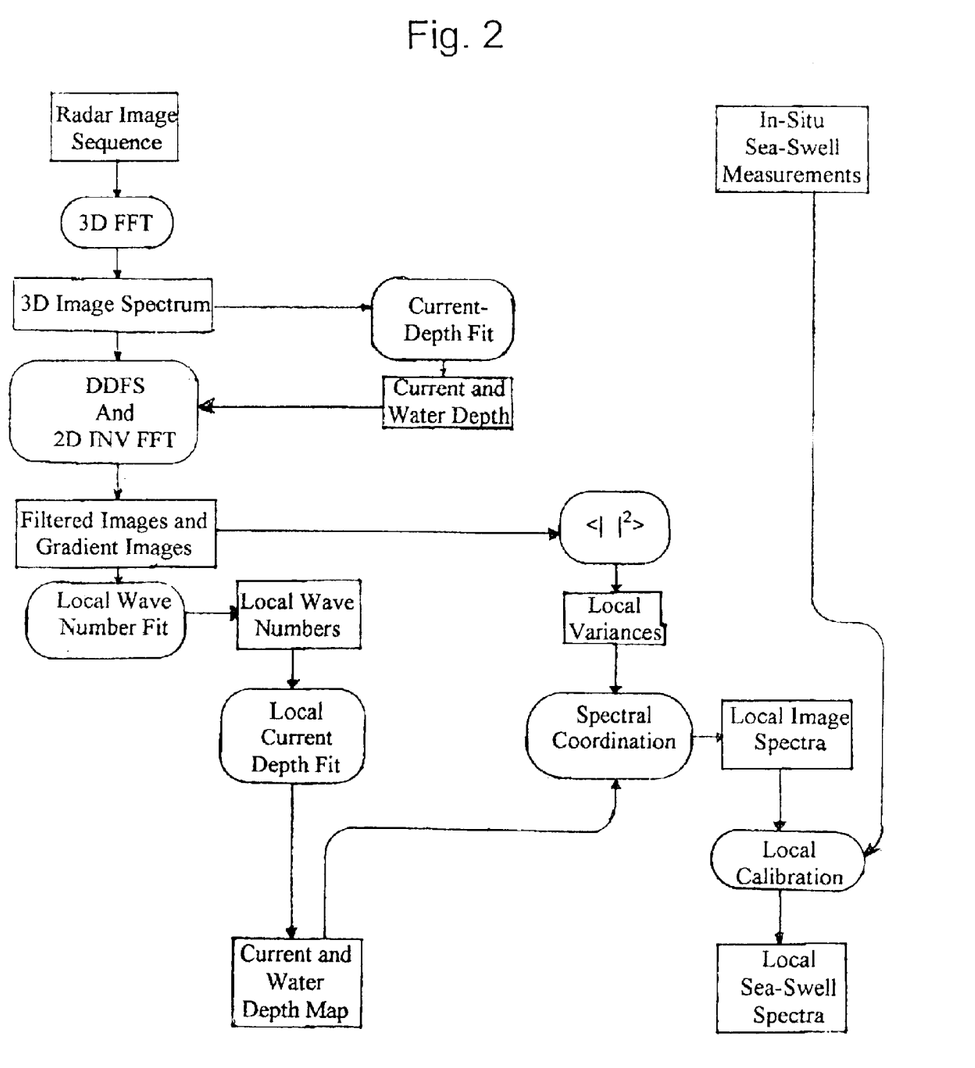
FIG. 2 shows schematically the method steps for the analysis of image sequences of inhomogeneous water surfaces of a sea swell field as they are found in coastal waters.

For the description of the local analysis of the signal sequences of the examined sea swell field for the determination of the spatial distribution of the hydrographic parameters which signal sequences were detected by the radar device and are present for example in polar coordinates, reference is made to FIGS. 1 and 2. The signal sequences (radar image sequences) provided by the method may form the basis for a global sequence analysis or a local sequence analysis according to the invention. This distinction is reasonable for the following reasons: The global sequence analysis is suitable for sea swell surfaces, which are homogeneous and stationary which means that the wave's properties detected by the radar device (wavelength, travel direction, period and amplitude) do not change spatially or in time.

With the global analysis, the spatial extension of the area covered by the radar device and the sensing duration is weighted, averaged and the hydrographic parameters are determined.

If however inhomogeneities occur in the sea swell field of interest, for example, by sea swell diffraction or refraction, the local sequence analysis is utilized that is the spatial fields of hydrographic parameters are calculated in this way.

Local Analysis Method

Figure 3:
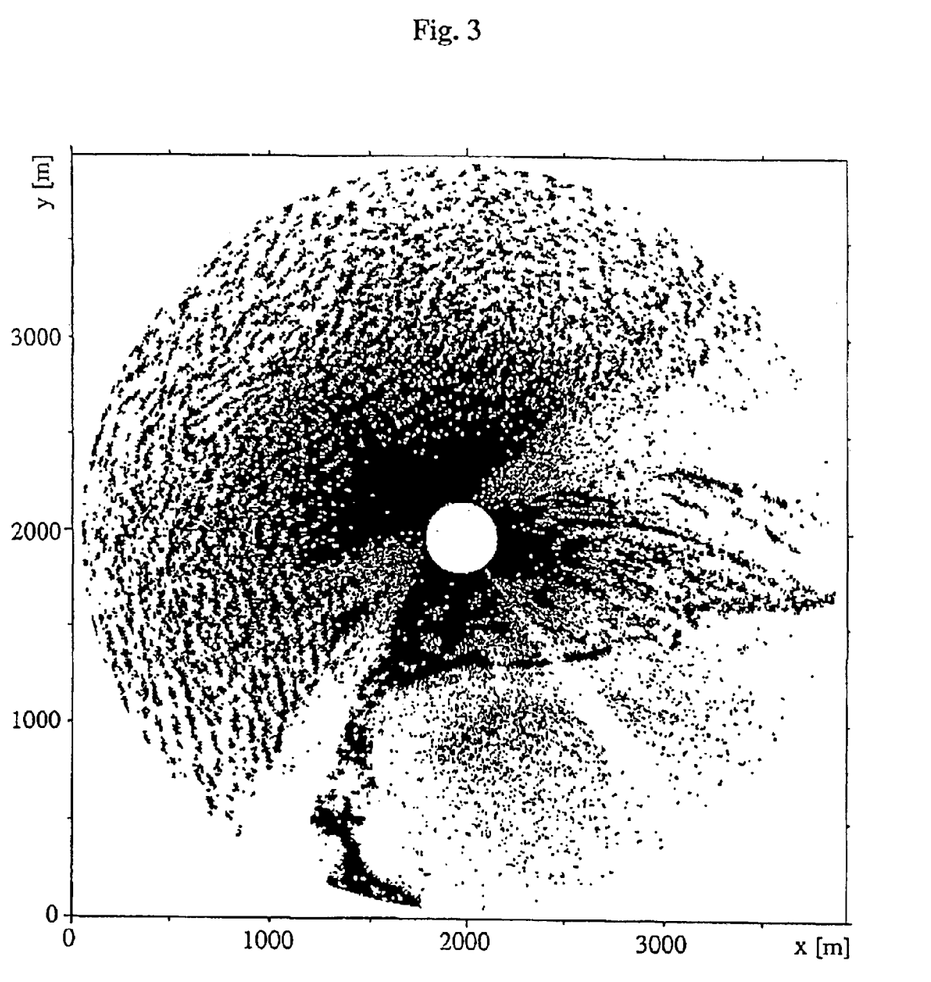
FIG. 3 shows a radar image of a signal sequence recorded by the radar device during a storm flood on Feb. 04, 1999 at 8 PM UTC, in List/Sylt, BRD.

Input values for the local analysis method are the signal sequences (radar image sequences), which are supplied by the radar device and which are interpolated onto a Cartesian grid and, if appropriate, in situ comparison measurements, which are required for a calibration. Comparison measurements are, for example, a plurality of deviations of the sea surfaces detected over a period of time and recorded for example by buoys. The signal sequences obtained by the radar device include, after the interpolation onto the Cartesian grid, the space-time information for the wave field examined in the form g(x, y, t)—see FIG. 3—, which shows the image of a sequence recorded from a radar installation near the light tower List/West, island of Sylt, on Feb. 4, 1999 at 8 pm UTC, during a storm flood. The sea swell depicted consists of a superimposition of different wavelengths and travel directions. This three-dimensional information is converted by a three-dimensional fast Fourier-transformation (3D FFT) into a three-dimensional complex-value frequency wave spectrum $\dot{G}(k_x, k_y, \omega)$. The value of the wave number k and the angular frequency $\omega$ are reciprocally related to the wavelength $\lambda$ and the period $\tau$. The Fourier transformation by way of the time coordinates includes the separation of the frequency components. The direction of the wave number vector indicates the travel direction of the waves. The complex value image spectrum $\dot{G}(k_x, k_y, \omega)$ includes the information of the gray value variance G as well as the phase $\phi$ of the partial waves of the sea swell depicted by the radar device.

Figure 4:
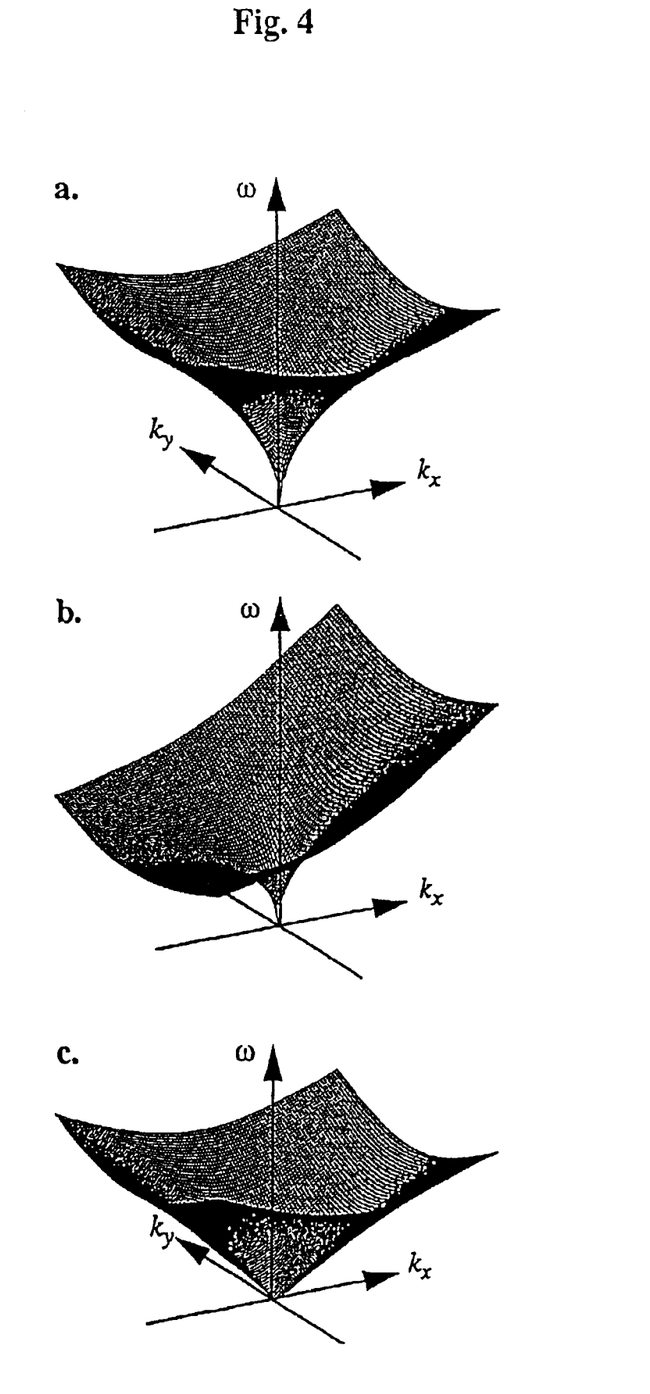
FIG. 4 is an optical representation of the dispersion relationship of surface waves in the wave number frequency space.

Like with global analysis, with the local analysis, the water depth d and the current $u_x$, $u_y$ are calculated by adaptation of the sea swell signal coordinates of the variance spectrum which are calculated by the formation of the value square, to the theoretical dispersion relation of the sea swell waves, see FIG. 4.

For the calculation of the water depth and current preferably the so-called "Least-Squares-Method" is used. The water current and water depth parameters obtained by way of this method are the desired base values for the global analysis. With a global analysis of a homogenous sea swell field, the values determined represent the complete analysis area. With the local analysis of an inhomogeneous sea swell field, these values represent weighted average values of the spatial distribution of the hydrographic parameters. The values for the current and the water depth determined from the variance spectrum represent in the local analysis no base values of the method but are used for specifying the dispersion filter as will be explained further below.

Figure 5A:
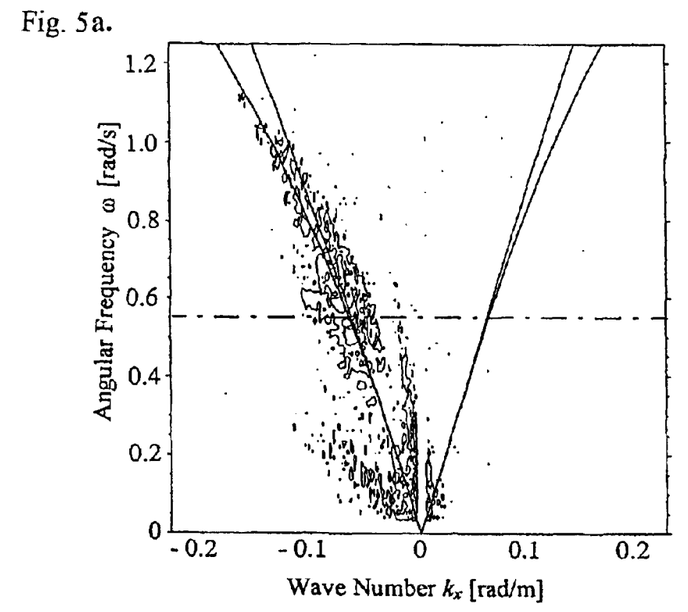
FIG. 5a shows a global three-dimensional frequency-wave number spectrum of a radar signal sequence in the form of a frequency wave number section in the west-east direction.
Figure 5B:
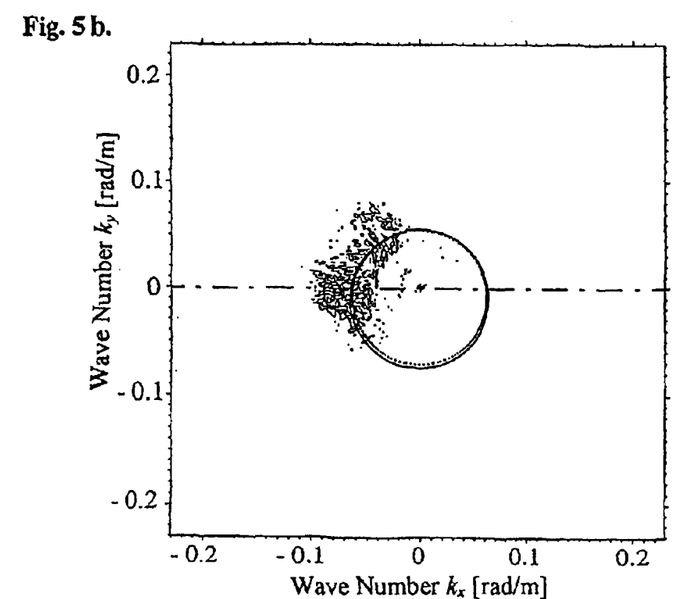
FIG. 5b shows a global three-dimensional frequency-wave number spectrum of a radar signal sequence in the wave number section at a frequency support location ω=0.55 rad/s corresponding to a period of τ=11.4 s, wherein the dispersion relationship of linear gravity waves is shown as a solid line and the dispersion relationship of the first harmonies is shown as a dash-dotted line and wherein the sea swell signal in the spectral space is blurred since the water depth and the current varied in the analysis area.

The global frequency-wave number spectrum calculated by a three-dimensional Fourier transformation has the following structure as represented in FIG. 5 on the basis of a measurement: the wavelength $\lambda$, or respectively, the wave number k of a sea swell are connected by a line or approximation with the wave period, or, respectively, the wave frequency by way of the linear dispersion relation of sea swell waves. The dispersion relationship in the three-dimensional wave-frequency space is represented in FIG. 4a. The current and the water depth however change the form of the dispersion relationship. This deformation of the dispersion relationship is represented for the current in FIG. 4b and for the water depth in FIG. 4c in an exemplary way. After the determination of the form of the dispersion relationship with the current-depth regression in the spectral wave number-frequency space the dispersion relation is used as a signal filter in order to separate the spectral part of the sea swell from noise. In addition to the linear sea swell signal localized on the dispersion envelope, the image spectrum contains non-linear signal structures which contribute however only a small amount to the whole variance of the image spectrum. The expression "speckle" designates interferences which result from the interaction of the radar beam with the rough sea surface and which result in a background noise in the image spectrum. The localization of the sea swell signal on the dispersion envelope facilitates the separation of the signal from the background noise (dispersion relationship). From the signal-to-noise ratio of the image spectrum, the wave height is derived in the global analysis. With the local analysis, the signal-to-noise ratio is broadened only after a back transformation into the local frequency range by means of a two-dimensional Fourier transformation for determining the spatial distribution of the wave height.

After determining the surface current and the water depth by adaptation of the dispersion envelope to the signal coordinates of the image spectrum, as explained above, the dispersion relationship defines a spectral filter. A blurring of the dispersion envelope caused by the spatial variability of the current and the water depth is accommodated by an increase of the wave number band width (widening) of the filter. The wave number sectional planes of the three-dimensional complex value image spectrum are spectrally analyzed by means of a dispersion and a directional filter. The dispersion filter is unfolded in the process for the designated signal-and-noise component.

Figure 6:
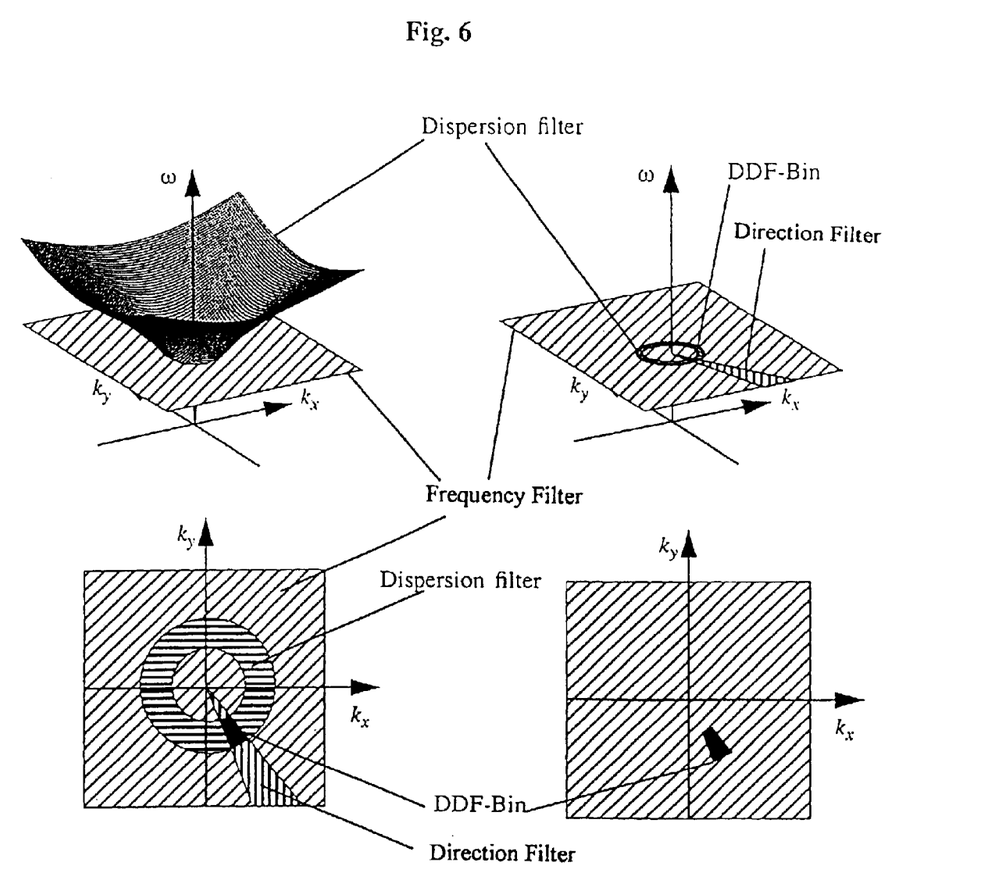
FIG. 6 is a schematic representation of a dispersion-direction-frequency separation, wherein the image spectrum is divided into so-called DDF-intervals by the application of dispersion-direction-and frequency separation.
Figure 7A:
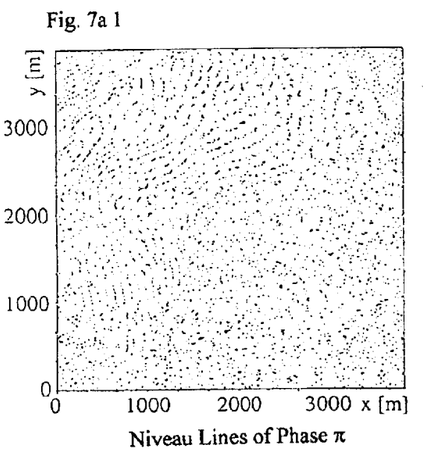
Figure 7A:
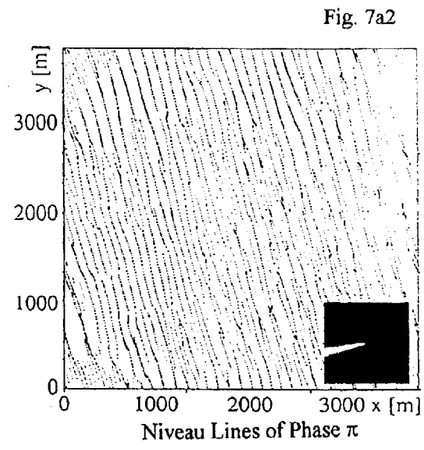
Figure 7B:
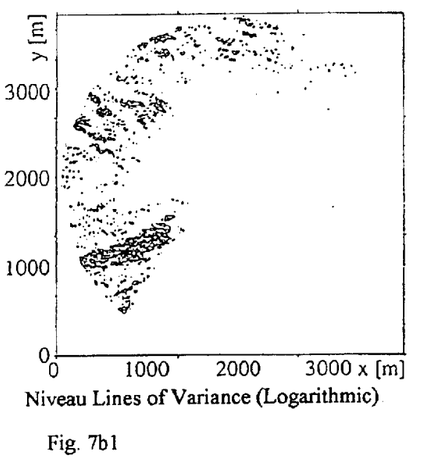
Figure 7B:
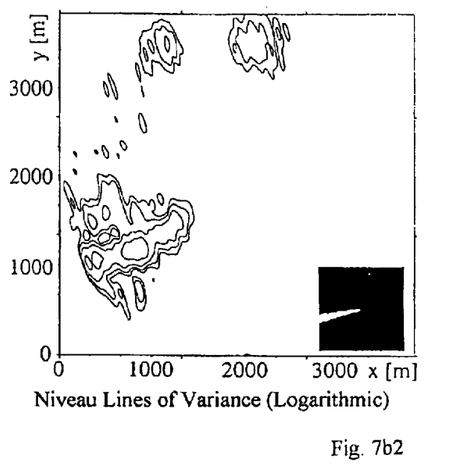

The principle of Dispersion-Direction-Frequency-Separation (DDFS) used in connection with the local analysis method is shown in FIG. 6. From the separated complex-value image spectrum wave number-section flatteners of constant frequency are calculated by an inverse two dimensional Fast Fourier Transformation (2D INV FFT) of complex value images of the signal-and-noise component in the local frequency range. The phase information of the image spectrum facilitates the reconstitution of the image structure. With a fixed frequency and wave travel direction maximally two values of the wave number fulfill the dispersion relationship. During measurement from a fixed location of the radar device practically only the smaller of the two solutions is relevant. This means that the sea swell signal is present after the DDFS and the subsequent back transformation into the local frequency range as so-called one-component images, which have locally only a single partial wave in the form of a complex-value sine wave. The information of the complex value images can be represented in the form of phase and variance images. For the measuring of the partial waves additionally the x- and y- components of the gradient image of the signal component is needed, which are also derived from the separated image spectrum using an inverse two dimensional Fast Fourier Transformation.

FIG. 7 shows, by example, the phase and variance images of the dispersion-frequency and the dispersion-frequency-direction analysis of the sea swell signal. Herein, as an example, the frequency $\omega=0.55$ rad/s corresponding to a period of $\tau=11.4$ s and the wave travel direction $\phi=258°$ were selected. The sample of the phase of the dispersion-frequency filtered image indicates the changes of the local wavelengths and travel directions as a result of the depth— and current refraction. Visible are the interferences of partial waves of different wave erections that means they are a multi-component image. Only with a sea swell state of low directional analysis can be eliminated. Generally, only the combination with a directional analysis of the sea swell signal leads to a one component image wherein the variance and the wavelength of the inhomogeneous sea swell varies spatially.

According to Havlicek et al. [1996, 1998], the complex-value one component images can be measured as follows: the images are proportional to the x- and y-component of the gradient images wherein the two proportionality factors correspond to the x- and y-component of a complex-value local wave number vector except for the imaginary i unit. The real part which equals the phase gradient of the image becomes the local wave number. From the imaginary part of the complex-value wave number, the local wave number bandwidth of the filtered sea swell signal can be calculated which indicates the inhomogeneity of the local image amplitude.

During the analysis of radar image sequences, the noise background which is caused by the "Speckle" and which is also within the wave number bandwidth of the dispersion filter is re-established after the back transformation into the local frequency range as a noise source in the frequency and direction-analyzed images.

Figure 8:
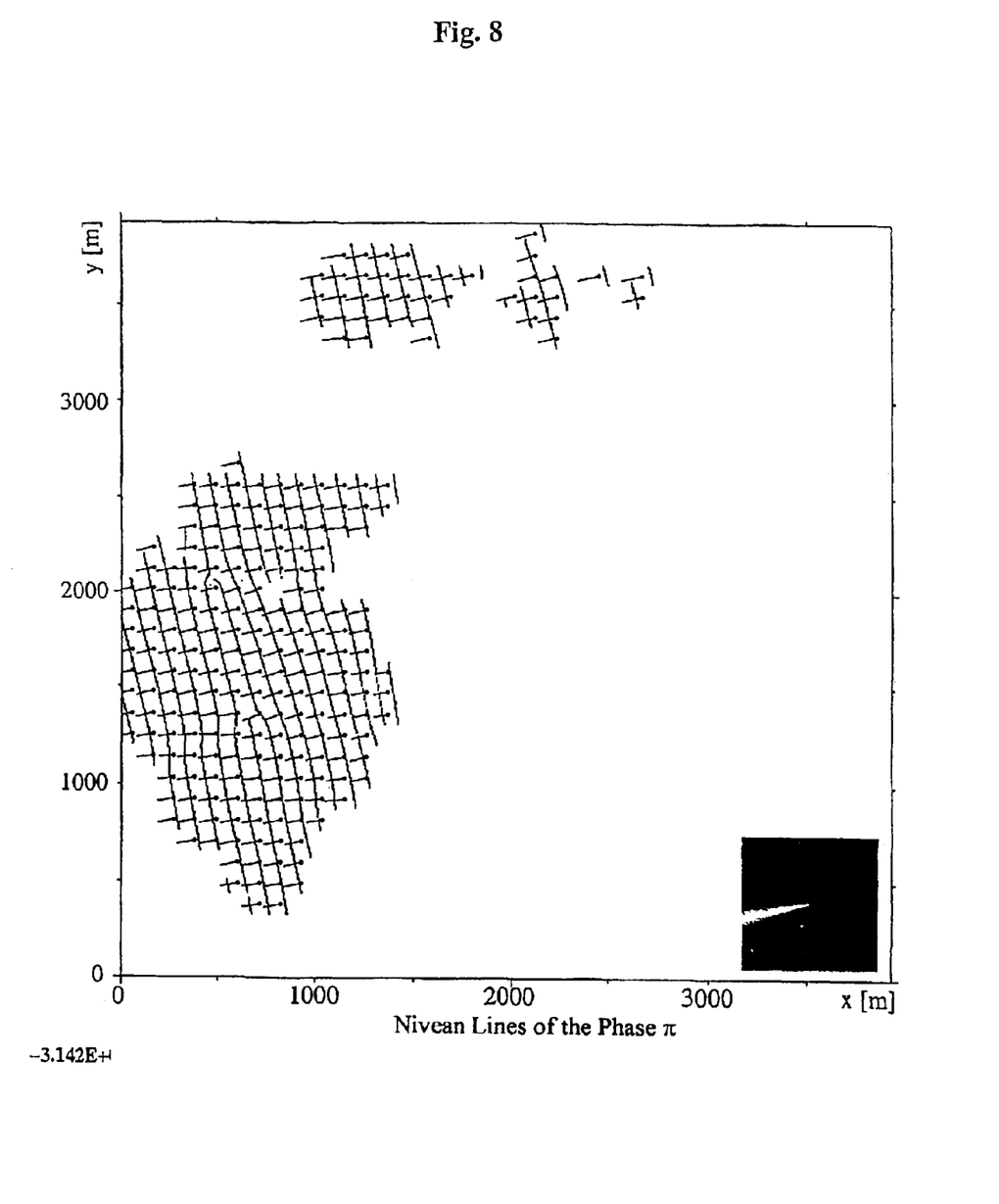
FIG. 8 shows the local wavelengths and travel directions entered into the phase image of the dispersion-direction filtered sea swell signal sequence (angular frequency ω=0.5 rad/s and filter direction φ=258°), wherein the analysis results for those areas are shown, wherein the correlation of the image with two components of the gradient image is high.

In order to increase the ruggedness of the method with regard to noise, the complex value local wave number is determined as a block by a regression procedure rather than pixel by pixel from the filtered images and gradient images. The block-wise image analysis is based on the assumption that the noise is spatially uncorrelated and that the sea swell is homogenous on the spatial scale of the analysis window. In this case, the absolute error in the determination of the local wave number is smaller the higher the correlation of the image with the components of the deviation image is. In FIG. 8, the wavelength, as obtained by the method and the travel directions are included in the phase image of the dispersion-frequency analyzed sea swell signal.

For the determination of current and depth maps, the Least Squares procedure as developed already for the global analysis is utilized wherein the dispersion relation is adapted to the spectral coordinates of the sea swell signal (see above). With the global analysis, the signal coordinates are taken from the global frequency-wave number spectrum. A value for the current and the water depth representative of the whole analysis area is determined.

The method has been modified in accordance with the invention for local analysis as follows: The signal coordinates are taken from the maps of local wave numbers which have been determined by the regression procedure described in the previous paragraph and the dispersion relation is assumed on the basis of the variable current and the water depth to be dependent on the location. The spatial resolution of the current- and depth- map corresponds in this case to the block size employed for the local wave number determination by means of the regression procedure.

Figure 9:
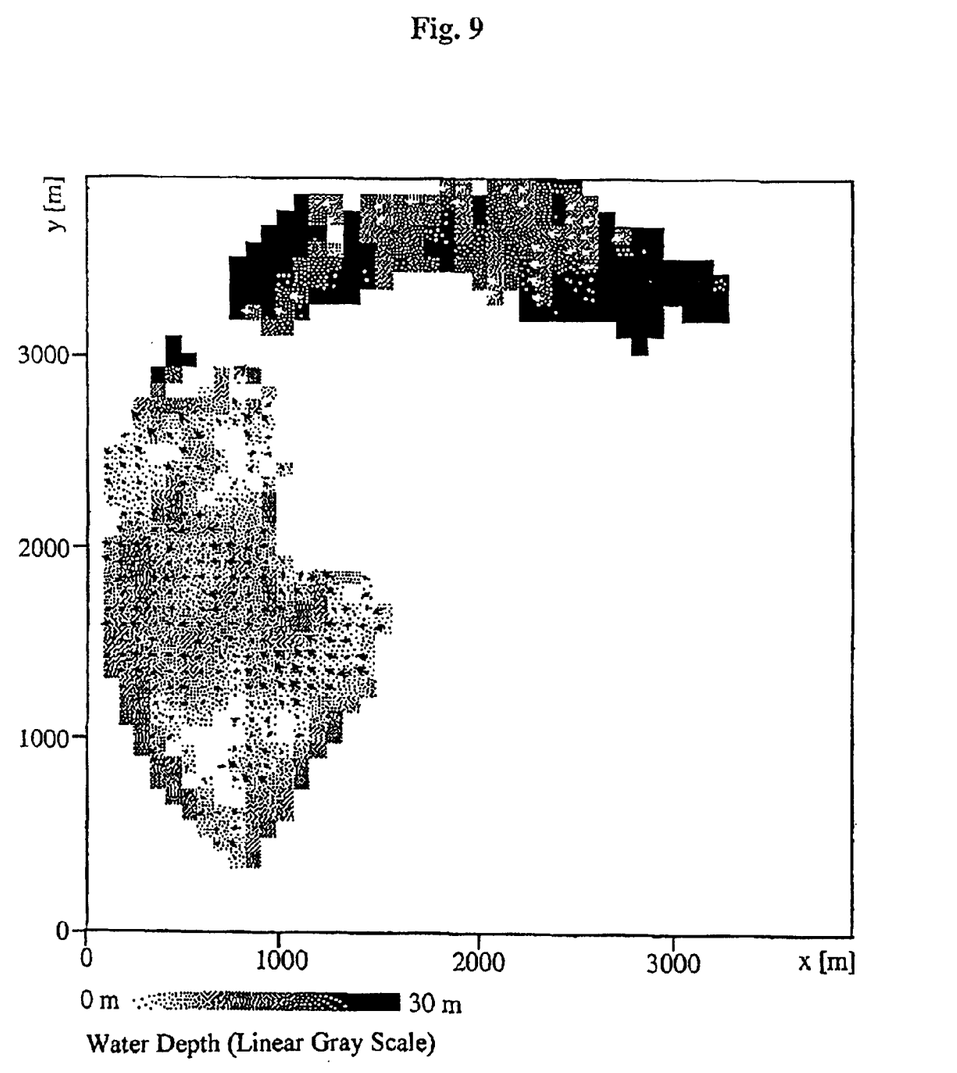
FIG. 9 shows a map of the current and the water depth generated on the basis of the parameters determined by the method according to the invention on Feb. 4, 1999 8 pm UTC List/Sylt, BRD, utilizing the regression procedure.
Figure 10:
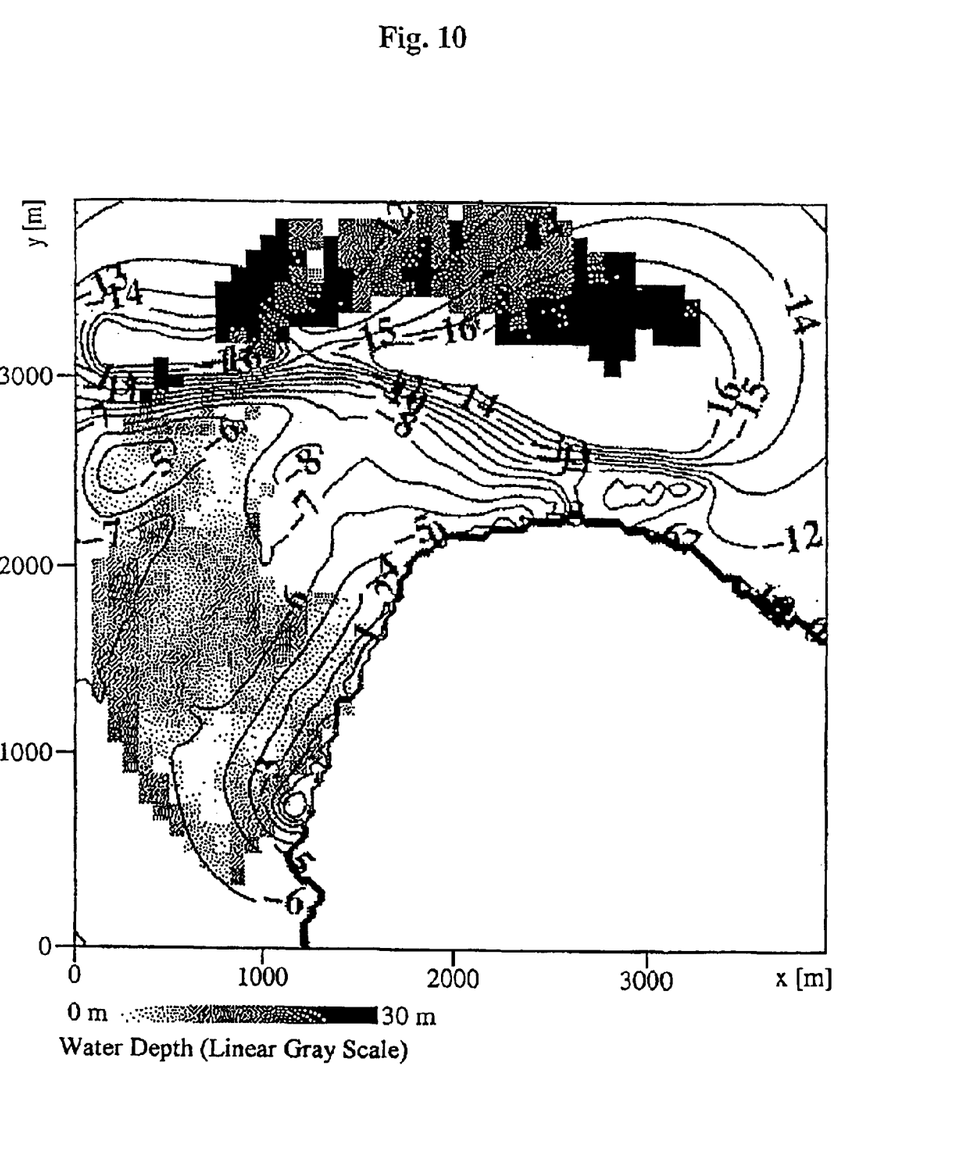
FIG. 10 shows a comparison of the water depth (gray value scale) as determined by the method according to the invention on Feb. 4, 1999 at 8 pm UTC List/Sylt BRD with a bathymetry of the respective area obtained by standard conventional echo soundings based on normal—zero.

FIG. 9 shows the field of current vectors of the tide currents as determined by the regression method for the example presented herein and also the depth map. The bathymetry calculated according to the method was compared with echo soundings which were performed from a ship using standardized echo sounding equipment based on a normal zero state, see FIG. 10. The tide current was outgoing during the procedure (previous high tide: 3:27 pm UTC and the next low tide: 9:45 pm UTC).

The local image spectra are determined as follows: the gray value variances of the local image spectra are taken from the blockwise determined gray value variance images of the dispersion-direction-frequency analyzed sea swell spectrum. The wave number base locations of the two dimensional 180° direction image spectrum are derived by reversal of the dispersion relation using the local current and depth information developed by the regression method.

Figure 11:
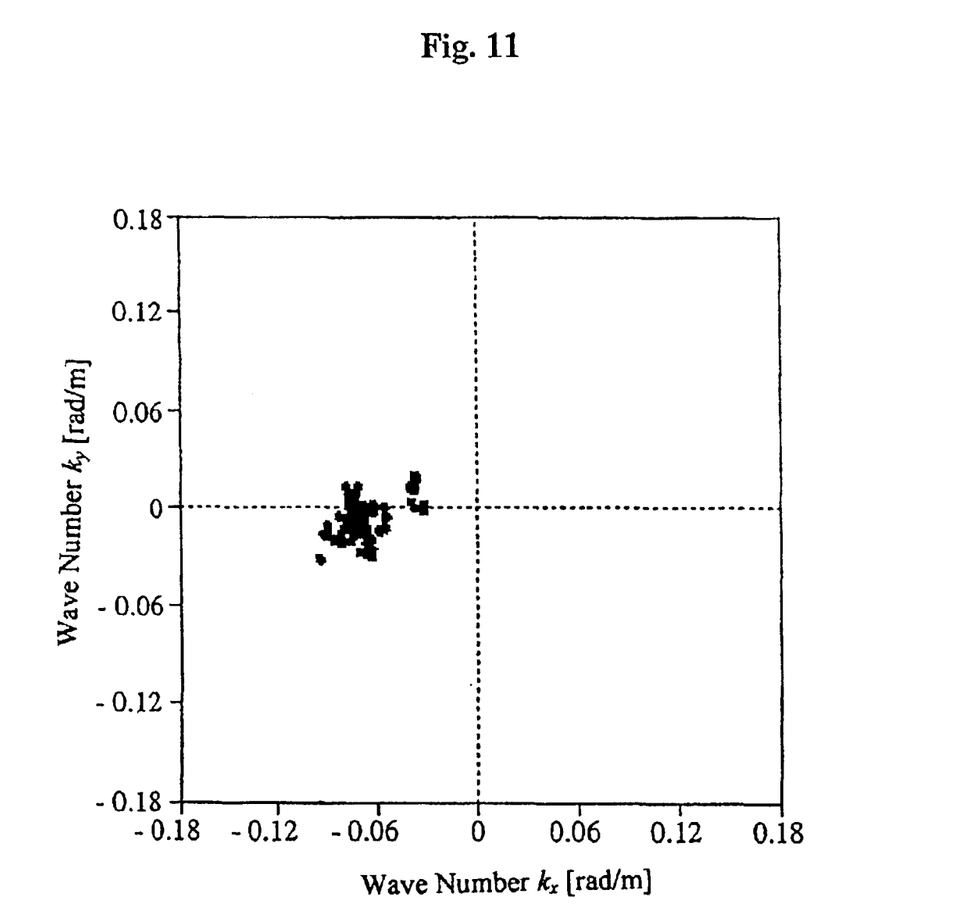
FIG. 11 shows a local image spectrum derived from an area of the sea surface of the size 100 m×100 m which is disposed to the west of the radar/device which is installed at the light tower List/West, Sylt, BRD.

FIG. 11 shows a local image spectrum determined in an analysis window located west of the location of the radar device and having the dimensions 100 m×100 m.

The sea swell spectrum, that is, the variance spectrum of the surface deviation, is connected linearly with the signal-to-noise ratio of the image spectrum, that is the gray value variance spectrum, by way of an image transmission function, see above. The image transmission function may be parameterized by a exponent law with the value of the wave number as base. The calibration parameters are determined at the beginning of a measuring phase by comparison with an in situ sensor of the wave height, the sea swell buoy already mentioned. The sea swell spectra however may be determined directly from the signal-to-noise ratio of the radar image sequences. Particularly, the significant wave height is proportional to the square root of the signal-to-noise ratio. The global calibration method based on the principles mentioned is adapted in accordance with the invention to the local analysis procedure as follows: The signal-to-noise ratio is determined in the local frequency range, unlike the global method, where it is determined in the frequency wave number range. That means that fields of the signal to noise ratio are obtained by which the local image spectra can be calibrated and maps of the significant wave height can be provided.

What is claimed is:

1. A method of determining hydrographic parameters describing in situ a sea swell field including the current and the water depth, by means of a radar device, from analog signal sequences supplied by the radar device, said method comprising the steps of: generating from said analog signal sequences a sequence of digitized signals in spatial coordinates, determining from said sequence of digitized signals in spatial coordinates, by Fourier transformation, a three-dimensional complex-value frequency-wave number spectrum, filtering the frequency wave number spectrum on the basis of the principle of dispersions relation, which interlinks the wave numbers and the frequencies of the sea swell for a localization of sea swell specific parameters by a separation of the signals from noise included in the signal sequence supplied by the radar device, and determining a signal to noise ratio, then determining from the signal to noise ratio the height of the waves and also determining, by localizing the signal coordinates in the surface area defined by the dispersion relationship, parameters describing the surface currents of the sea swell field in a three-dimensional spectral space and the water depth, and employing the phase information concerning the waves monitored in the sea swell field, which is contained in the wave frequency spectrum, to determine the parameters of the sea swell field.

2. A method according to claim 1, wherein wave amplitude information of the monitored waves of the sea swell field contained in the frequency wave number spectrum is used for the determination of the parameters of the sea swell field.

3. A method according to claim 1, wherein the three-dimensional spectrum is separated with respect to dispersion, direction and frequency in order to obtain a plurality of measurable images (phase, variance) of individual waves.

4. A method according to claim 3, wherein the spatial distribution of the wavelength of an individual wave of the plurality of images (phase, variance) for each point of a locally limited part of the area under examination is collected and the spatial distribution of the hydrographic parameter including the water depth and the current are calculated therefrom.

5. A method according to claim 1, wherein from the spatial distribution of the signal-to-noise ratio, the spatial distribution of the wave height is determined.

* * * * *